Aug. 6, 1929.  C. H. DOLAN, JR  1,723,606
MACHINE FOR TREATING THE TOPS OF PINEAPPLES
Filed Jan. 14, 1928   6 Sheets-Sheet 1
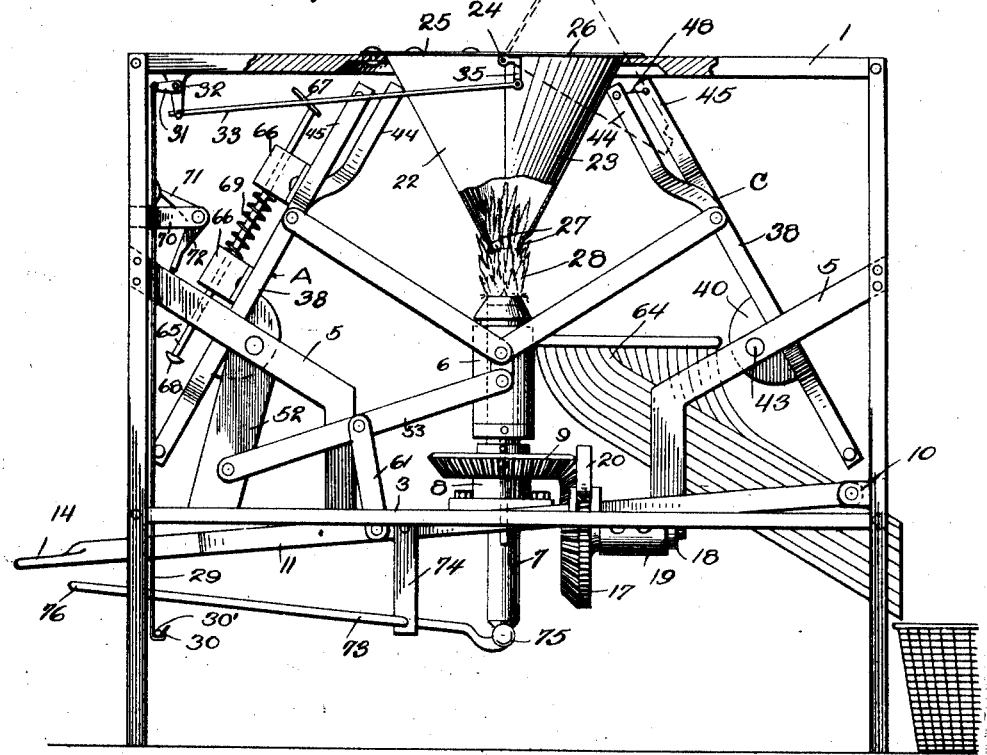
INVENTOR.
Charles H. Dolan Jr.
BY O'Neill & Burns
ATTORNEYS Aug. 6, 1929.        C. H. DOLAN, JR        1,723,606
MACHINE FOR TREATING THE TOPS OF PINEAPPLES
Filed Jan. 14, 1928    6 Sheets-Sheet 2
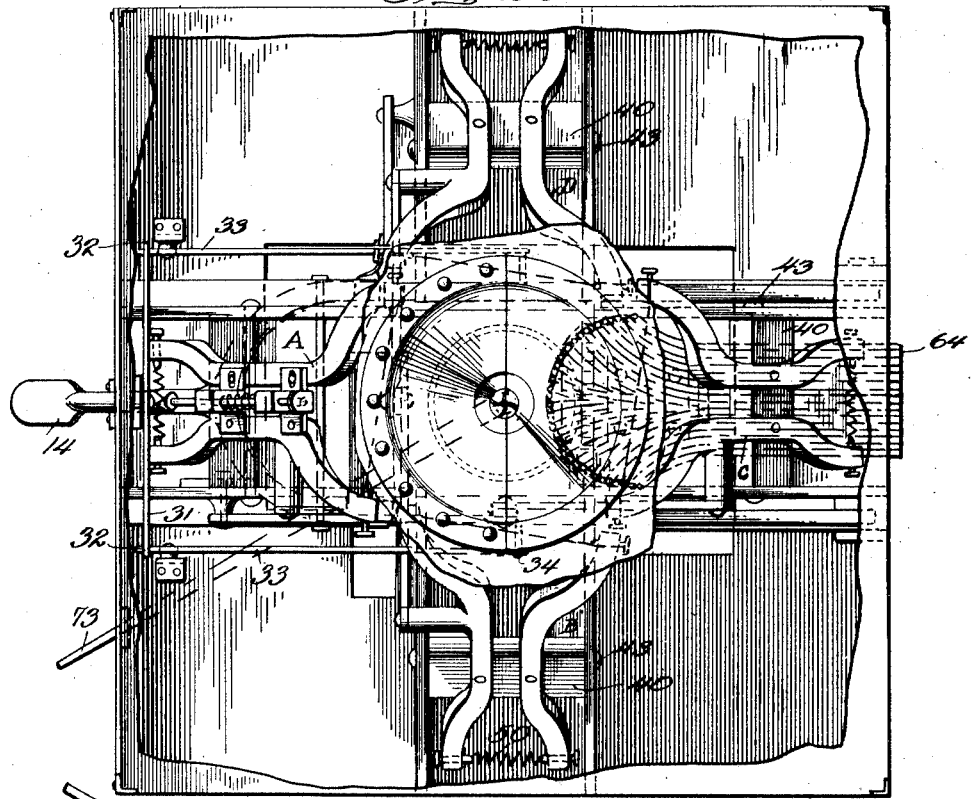
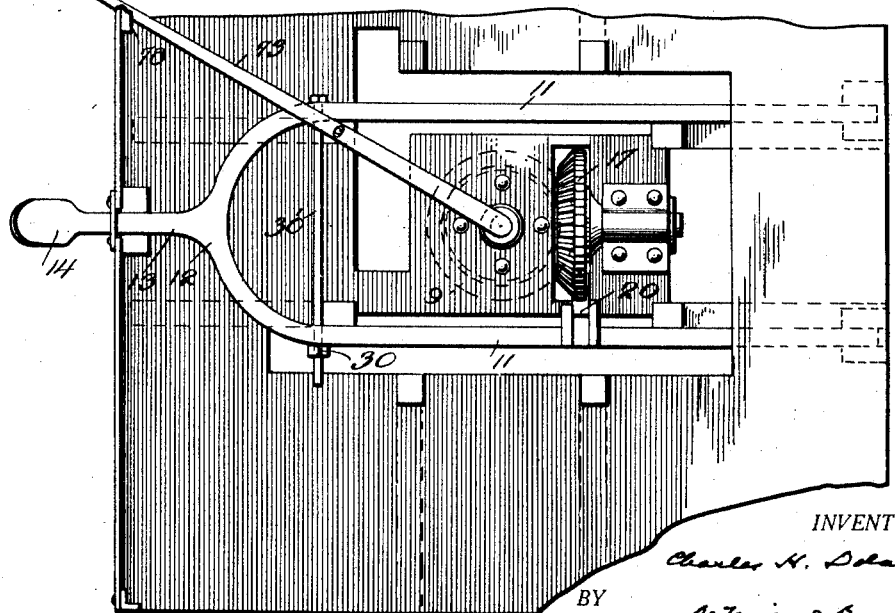
INVENTOR.
Charles H. Dolan, Jr.
BY
ATTORNEYS Aug. 6, 1929.   C. H. DOLAN, JR   1,723,606
MACHINE FOR TREATING THE TOPS OF PINEAPPLES
Filed Jan. 14, 1928   6 Sheets-Sheet 3

INVENTOR.
Charles H. Dolan, Jr.,
BY
O'Neil & Bunn
ATTORNEYS

Aug. 6, 1929.  C. H. DOLAN, JR  1,723,606
MACHINE FOR TREATING THE TOPS OF PINEAPPLES
Filed Jan. 14, 1928  6 Sheets-Sheet 4

INVENTOR.
Charles H. Dolan, Jr.,
BY O'Neill & Bunn

ATTORNEYS.

Aug. 6, 1929.                C. H. DOLAN, JR                  1,723,606
                  MACHINE FOR TREATING THE TOPS OF PINEAPPLES
                        Filed Jan. 14, 1928        6 Sheets-Sheet 5
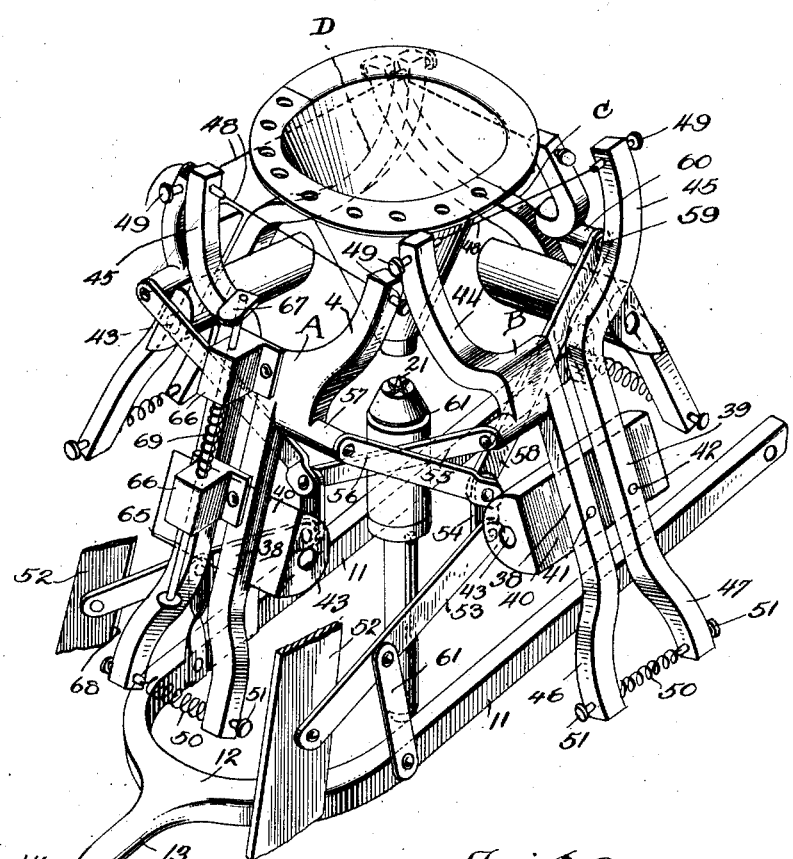
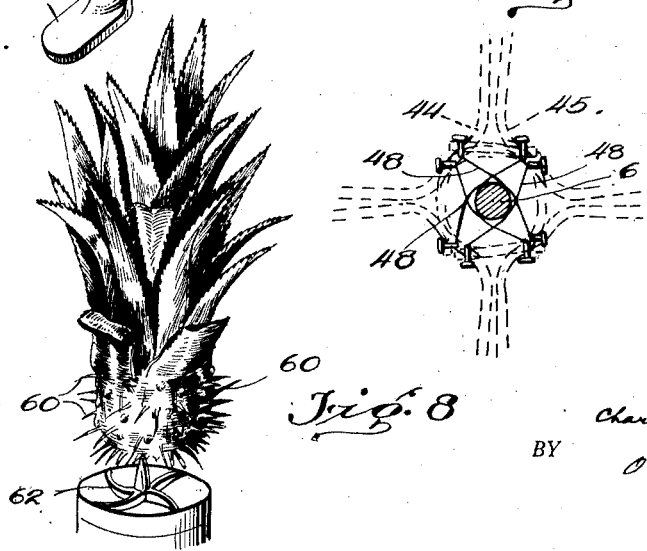
INVENTOR.
Charles H. Dolan, Jr.,
BY
O'Neill Brun
ATTORNEYS.

Aug. 6, 1929.  C. H. DOLAN, JR  1,723,606
MACHINE FOR TREATING THE TOPS OF PINEAPPLES
Filed Jan. 14, 1928   6 Sheets-Sheet 6
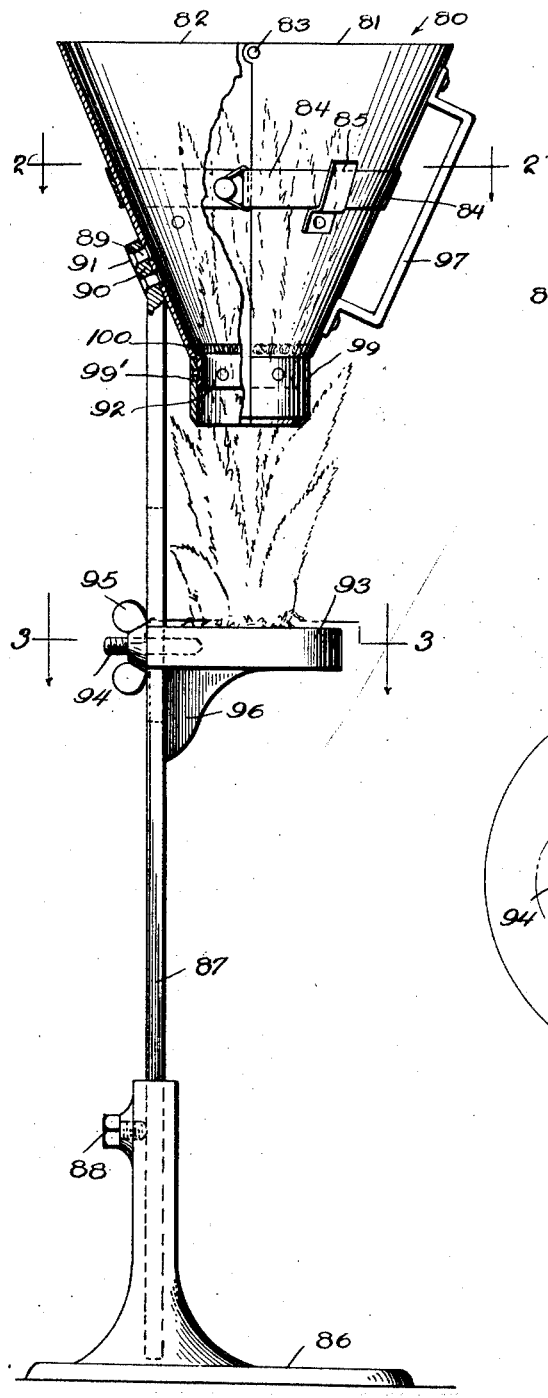
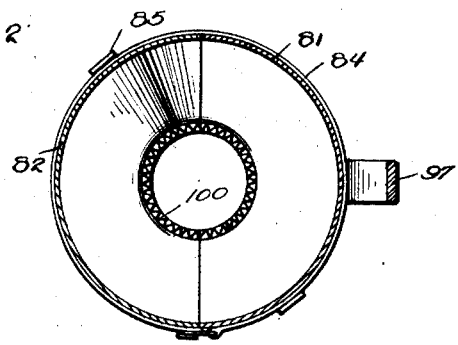
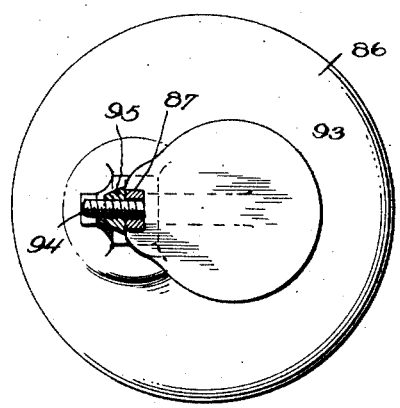
INVENTOR.
Charles H. Dolan Jr.
BY
O'Neil & Bunn
ATTORNEYS.

Patented Aug. 6, 1929.

1,723,606

UNITED STATES PATENT OFFICE.

CHARLES H. DOLAN, JR., OF HONOLULU, TERRITORY OF HAWAII.

MACHINE FOR TREATING THE TOPS OF PINEAPPLES.

Application filed January 14, 1928. Serial No. 246,798.

This invention relates to a machine for treating pineapple tops, slips and shoots, and, more specifically, to an apparatus for stripping the leaves from the lower portions of the tops, slips and shoots of pineapples, after the said tops, slips and shoots have been removed from the main body of the fruit.

It is to be understood that, in the pineapple industry of the present day, a very large proportion of the harvest is sent to the cannery, and subsequently shipped to the retailers. Immediately after the fruit is harvested, for canning purposes, the top of the pineapple is broken away from the body thereof. The main portion of the top so removed is called the crown, and comprises a fibrous growth carrying laterally extending leaves, the lower section of the said crown including a plurality of seed nodules which slightly project laterally of the body. The crowns are used as plantings for the future crop, and it is essential that the laterally extending leaves adjacent the seed nodules be removed so that said crowns may be easily inserted into the ground.

Prior to the development of the present invention, it has been customary to remove the leaves by hand, but, since the leaves are growths of exceeding toughness, removal by hand is a very difficult operation. The leaves grow immediately adjacent the seed nodules, and the use of a cutting implement, in the hands of careless laborers, is likely to injure the nodules, and thereby render them ineffective from a productive standpont. In removing the leaves by hand, to snap or tear them from the body of the crown, each laborer completely wears out a set of heavy gloves each day, and even then, in many instances, the hands of the laborer are so cut and torn by the tough, cactus-like leaves, that continued work is often delayed.

The present invention relates to means for mechanically removing the leaves, the primary object of the invention being the provision of power-actuated means adapted to mechanically strip the leaves from the pineapple crown, slips or shoots without injury to the seed nodules.

Other objects of the invention will be made apparent in the accompanying drawings, when read in connection with the specifications forming a part thereof.

In said drawings:

Fig. 1 is a side elevation, partly in section, showing an apparatus embodying my invention, certain instrumentalities being eliminated in this view for the purpose of clarity.

Fig. 2 is a top plan view of the apparatus illustrated in Fig. 1.

Fig. 4 is a front elevation of the apparatus shown in Fig. 1.

Fig. 7 is a perspective view with the supporting members eliminated, for clarity, and illustrating the means for actuating the stripping devices.

Fig. 8 is a perspective view of a pineapple top to be treated, and showing the top of the supporting mandrel.

Fig. 9 is a reduced detail showing the position of the stripping devices when in the position as shown in Fig. 3.

Fig. 10 is a bottom view of the device, looking upwardly.

Fig. 11 is a side elevation, partly in section, of a hand actuated device for a similar purpose.

Fig. 12 is a section on the line 12—12 of Fig. 11, and,

Fig. 13 is an elevation, partly in section, of the base of the device shown in Fig. 11.

Figure 3:
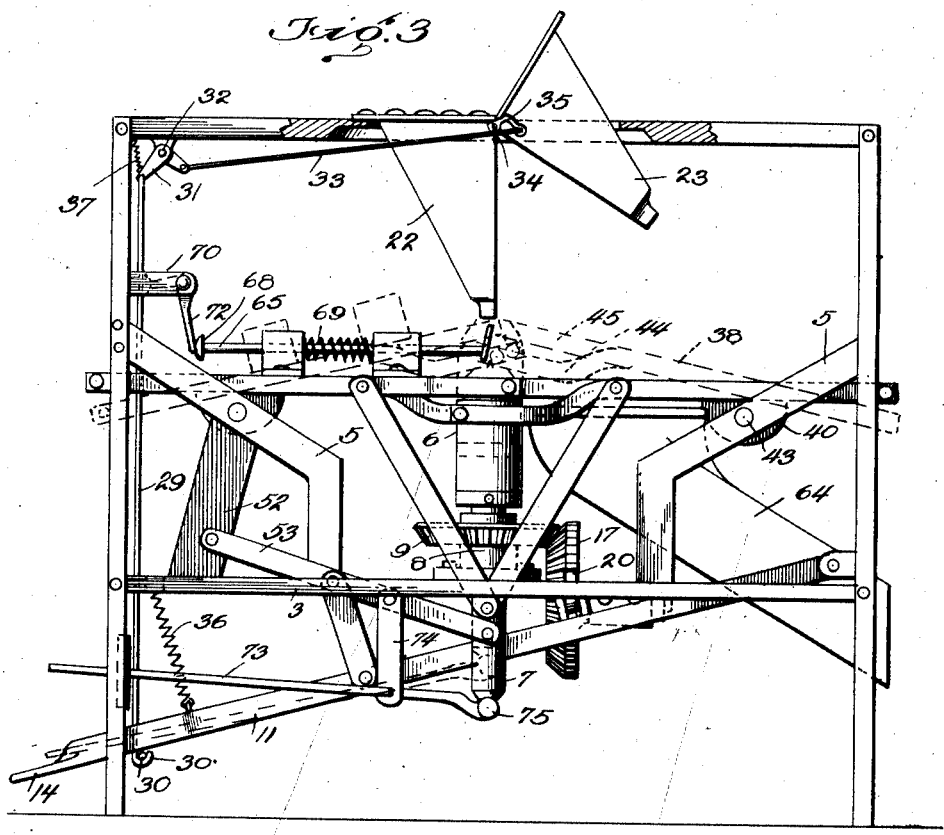
Fig. 3 is a view similar to Fig. 1, showing the stripping devices in a different position.

Now referring specifically to the drawings, in which similar reference numerals indicate like parts throughout the several views, 1 indicates a table having the necessary supporting legs 2, a shelf 3, and the bracing struts 4 and 5.

Figure 5:
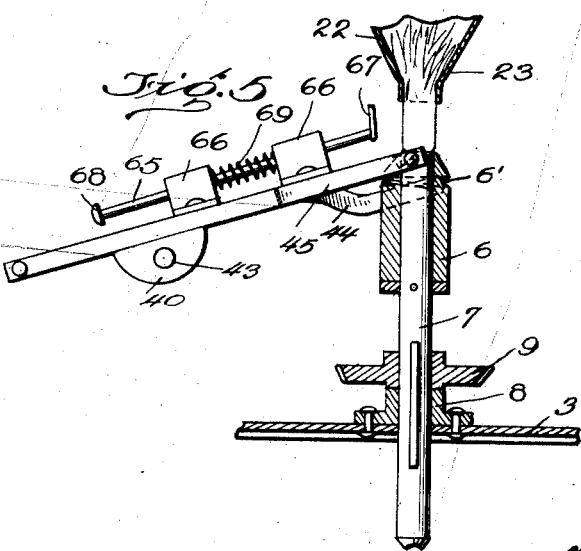
Fig. 5 is a sectional detail view of a rotative mandrel forming part of my invention, and showing the plunger for removing the treated top, slip or shoot.

A mandrel 6 is mounted on a vertically-movable shaft 7, extending downwardly, centrally of the table, and through a collar 8, bolted to the shelf 3, and a beveled gear 9 is keyed onto the shaft 7, as illustrated in Fig. 5. Pivoted to brackets 10, secured to the rear of the table, is a foot lever comprising two arms 11, 11 forming a yoke 12, from which extends a neck 13, terminating in a treadle 14, extending outwardly at the front of the table, as best seen in Fig. 10. As illustrated in Fig. 4, the neck 13 is guided in its movements by a guide channel 15, formed by parallel braces 16, 16, extending between the shelf 3 and the lower connected ends of the bracing struts 4, 4.

A beveled gear 17 is mounted on a stub shaft 18 having bearing in a trunnion 19 carried by the shelf 3, said gear 17 extending upwardly above the shelf, and being in mesh with the gear 9 carried by the shaft 7. As illustrated in Fig. 4, the gear 17 is provided with ratchet teeth on its outer periphery, and a pawl 20 is secured to one of the arms 11, adjacent said gear 17, the front end of the pawl engaging the teeth on the periphery of the gear, the action being such that each downward reciprocation of the foot lever will cause a partial rotation of the gear 17, the return movement of the foot lever causing the pawl 20 to slide over the ratchet teeth, as will be understood. Obviously, since the gear 17 is in mesh with the gear 9, each downward movement of the foot lever will cause a partial rotation of the mandrel 6.

In actual operation, in the removal of the leaves from the crown, the latter is placed upon the mandrel 6, an upstanding spur 21 being centrally carried by the mandrel and piercing the lower portion of the crown to temporarily hold it in position. A guard member, here shown in conical form and hereinafter called a funnel, is adapted to extend downwardly through the top of the table and over and entirely surround the crown, with the exception of the lower portion thereof, as illustrated in Fig. 1. The guard member is composed of a fixed section 22, in the shape of one-half of a funnel bisected on its vertical axis, and a second section 23, which is pivotally secured to the section 22, at 24. The lower extremities of each of the sections 22 and 23 are pressed inwardly so as to form vertically extending end flanges 27 constituting the lower end of the funnel or crown guard, when the two sections of the funnel are in the position shown in full lines, Fig. 1. It is to be noted however that the funnel section 23 is movable laterally of the fixed section 22, to the position shown in dotted lines, Fig. 1, whereby to permit the lower portions of the funnel to embrace the upper portion of a crown 28, seated upon the mandrel 6. It is also to be understood that, in seating the crown upon the mandrel, the section 23 is closed and the crown inserted through the top of the funnel and pressed downwardly upon the mandrel.

To raise and lower the section 23 of the funnel guard, I provide a rod 29, one on each side of the machine, terminating in a hook 30. The rods 29 extend upwardly and are secured to one end of bell crank levers 31, pivotally mounted at 32 to the table, the other ends of said bell-cranks being pivotally connected to another rod 33. The pivot pins 24, on which the funnel section 23 is mounted, also carry a crank arm 35, to the free end of which the rod 33 is secured. Extending between and secured to the hooks 30 is a connector rod 30'. From the foregoing it is obvious that a complete depression of the treadle 14 will cause the yoke 12 to engage the rod 30', carried by the hooks 30, thereby exerting a downward pull upon the rod 29 and, through the medium of the bell crank 31, upon the rod 33 to raise the section 23, as shown in full lines, Fig. 3. The spring 36, Fig. 3, connected to the yoke 12 and to the table, tends to return the yoke to normal position, and the spring 37, assisted by gravity, returns the bell-crank lever, and hence the section 23, to normal position.

Figure 6:
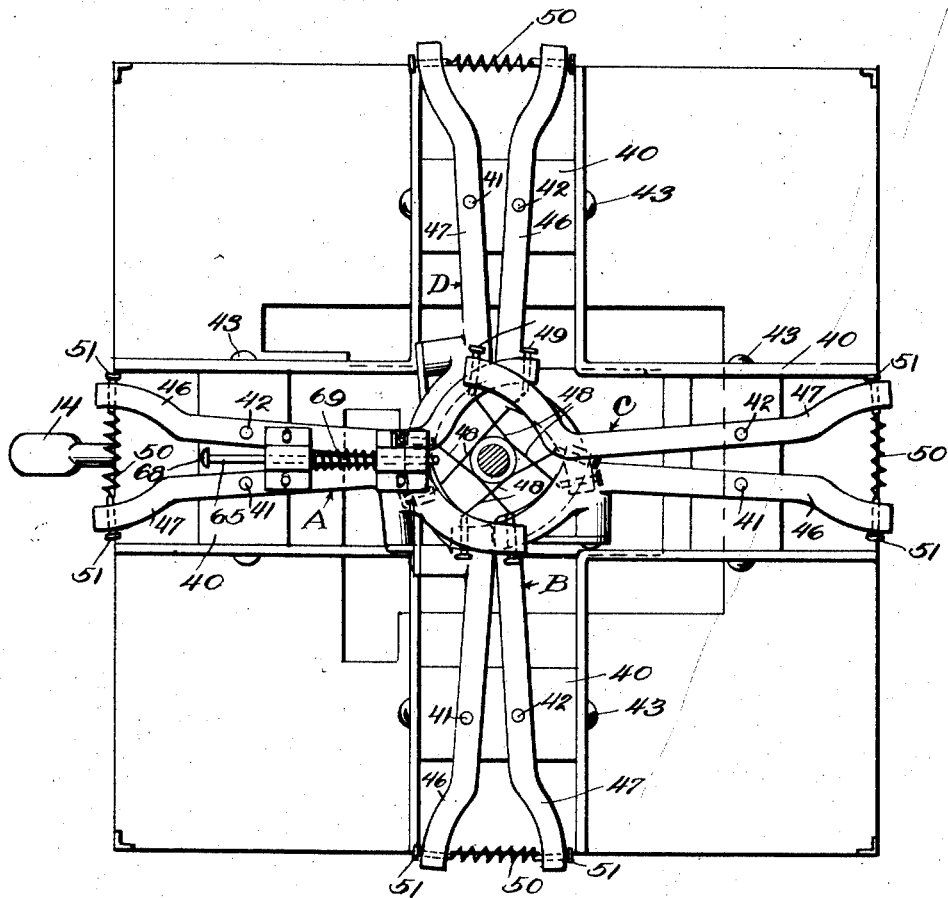
Fig. 6 is a top plan view of the apparatus, when the stripping devices are in the position illustrated in Fig. 3.

With the crown 28 in position on the mandrel 6, and the sections 22 and 23 as shown in full lines Fig. 1, certain instrumentalities are actuated to strip the leaves from the exposed or lower portion of the crown. As best illustrated in Figs. 6 and 7, a yoke member is provided for each of the four sides of the table, said members each consisting of yoke arms 38, 39, pivotally secured to a block 40, by pins 41 and 42 respectively, as shown in Fig. 7, said block 40 being mounted on pins 43, having bearings for pivotal movement in the braces 5, as shown in Fig. 1. Each of the four yoke members are exactly alike, having diverging arms 44, 45 at the top, and diverging lower ends 46, 47, the arms 44, 45 extending inwardly and upwardly to reach a point adjacent the top of the funnel guard sections 23, 22, as illustrated in Fig. 1, in which figure only two of the yoke members are illustrated.

Between the upper ends of the arms 44 and 45, is secured a stripper or cutter 48, in the form of a flexible wire, spanning the space between the extreme ends of the arms 44 and 45, each end of the wire cutter or stripper being secured to a set screw 49, 49, extending through said ends, whereby to regulate the tension on the wire, as desired, and as will be clearly understood. The extreme lower ends of the arms 46, 47 are connected by a coiled spring 50, each end of the spring 50 being secured to a set screw 51, extending through one of said ends, whereby the tension of said spring is adjustable. It is to be understood that the strippers or cutters 48 may be provided with a cutting edge which will actually cut through the leaves on the exposed portion of the crown, the cutters flexing laterally to follow the contours of the funnel, but not being flexible vertically; or the wires may be of the ordinary variety and adapted to merely exert downward pressure upon the leaves to partially cut, and partially "snap" or break them off the crown, during the trimming operation to be hereinafter set forth.

In order to cause pivotal movement of the four yokes hereinbefore referred to, they are connected to the arms 11, 11 of the foot lever, by linkage now to be described. Between the braces 5 and the shelf 3, on each of the four sides of the table or frame of the machine, is provided a strut 52, and a link 53 is pivotally secured at one end to one of said struts, and at the other end, to a short connector link 54, the top end of the link 54 being in turn pivotally connected to one end of a link 55. The other end of the link 55 is pivotally secured, at 56, to an offset shoulder 57, formed on the arm 38 of one of the yoke arms. Also pivotally secured to the top end of the connector link 54, is still another link 58, the far end of the link 58 being pivotally connected at 59, to the shoulder 60 formed on the yoke opposite the yoke carrying the shoulder 57 heretofore referred to. The linkage just described is connected to one of the foot lever arms 11, by means of a link 61 pivoted to said arm 11, at one end, and to the link 53 at the other end, all as illustrated in Fig. 7. The other arm 11 is similarly connected to a duplicate chain of linkage, it being understood that, upon downward movement of the treadle 14 the linkage described causes all of the yokes to move inwardly towards the funnel guard so that the cutting or stripping wires contact and ride down the outside of the tapering sections 22 and 23.

For the purpose of clarity in explanation, while all the yokes are exactly of the same construction, reference letters A, B, C and D have been applied to them in Fig. 7. It is to be noted that the connection to the right-hand arm 11 causes the desired tilting action of the yokes A and C, while a similar connection to the left-hand arm 11 causes the same action of the yokes B and D.

It is to be observed that, in each yoke, the left-hand arm 44 is shown to be somewhat longer than its associated arm 45. One result of this construction is that, when all the yokes are converging and descending, the long arm of one yoke travels in a path adjacent the short arm of the adjacent yoke, so that the yoke arms do not contact. Another result is that the cutting or stripping wire 48 is higher at one end than at the other so that, as it passes below the ends of the sections 22 and 23, it strikes the leaves on the exposed portion of the crown at an angle, providing a shearing action which is most efficacious in removing the leaves from the crown.

Referring to Fig. 7, and specifically to the yoke A, as shown at the left center of the figure, the movement of said yoke will be described, and, since all the yokes operate in a similar manner, a description of the operation of one of them will suffice for all. When the foot lever is depressed the arm 11 at the right, through the linkage 61, 53, 54, 55, causes a downward pull upon the shoulder 57 secured or integral with the yoke A. Such pull results in a pivotal movement of the block 40, on the pins 43, and the upper arms 44, 45 of the yoke are moved inward and downward. Such movement obviously causes the wire or strippers 48 to approach the funnel guard and to finally contact the sides of sections 22 and 23, to ride downwardly in contact therewith during and until the downward movement of the foot lever has ceased.

Obviously, when the wire or stripper 48 forcibly contacts the sides of the funnel sections 22, 23, it is flexed to the contour of said sections, and the pressure tends to cause a convergence of the arms 44 and 45 of the yoke. Such convergence is resiliently resisted however, by the spring 50 which connects the lower ends 46, 47 of the yoke arms, with the result that, while the wire 48 passes downwardly in constant wiping contact with the sides of the funnel, the funnel contacting portion thereof is curved to conform substantially to an arc of a circle, the diameter of which constantly decreases as the wire descends, the spring 50 being always operative to prevent any looseness or sag in the wire. As the wire 48 passes downwardly beyond and out of contact with the lower end of the funnel, it contacts the leaves 60 (see Fig. 8), and either cuts them off with a shearing action, or "snaps" them off by pressure.

It is to be remembered that, during the descent of the yoke A, the yokes B, C and D are being similarly forced downwardly, and, as heretofore explained, the construction and position of the yokes is such that none of them contact, each to each, during such downward movement, but, when in their lowermost position, as shown in Figs. 3, 6 and 9, they are arranged in overlapped relation, all of the strippers or cutters 48 having passed downwardly over the crown, to remove the leaves 60, and have come to rest in the sliding sleeve 61, provided on the mandrel 6, the spring 50 retaining said strippers in said sleeve. It is to be noted that each wire 48, when it reaches the crown on the mandrel 6, encircles and contacts with substantially one-half of the circumference of the crown. Consequently, since there are four strippers, each half portion of the crown is traversed by two of the strippers, resulting in the removal of all of the leaves 60 which are carried by the crown.

Upon the bottom surface and periphery of pineapple crowns, are found small leaves which it is desirable to remove. For this reason the upper surface of the mandrel 6 is provided with a plurality of cutter blades 62, best seen in Fig. 8. Under depression of the foot lever, the pawl 20 carried thereby serves to rotate the mandrel, as heretofore explained, and the blades 62 effectively sever said small leaves not reached by the wires.

After the wires 48 have removed the leaves 60 from the crown and are resting in the groove 61, a further downward pressure of foot lever causes the yoke 12 to contact the connecting rod 30′, depressing the hooks 30, and the rod 29, and causing the bell crank lever 31 to move the section 23 of the funnel to the position shown in Fig. 3. When the section 23 releases the crown, the latter generally falls from the mandrel 6 upon a chute 64, extending beneath the table to a point adjacent the mandrel, and the crown is delivered to a receptacle at the lower end of the chute. However, in order to assure that the crown will be removed from the mandrel 6, the following instrumentalities are employed.

As best illustrated in Figs. 1 and 5, the yoke A carries a plunger rod 65, slidably mounted in brackets 66, 66, secured to said yoke. The front end of the rod 65 carries a clearing shoe 67, and a head 68 is provided on the rear end of said rod, a spring 69 surrounding the rod between the brackets and exerting its tendency to retain the rod 65 in the position shown in Fig. 1. Secured to a bracket 70, carried by the table, is a bell-crank 71, one end of which is connected to the rod 29, the other end 72 of said lever being in a position directly behind said head, when the yoke A is fully down, Fig. 3. The final depression of the foot lever exerts a downward pull on the rod 29, causing the end 72 of the bell crank to contact the head 68 on the rod 65, and to project the pusher shoe 67 against the crown on the mandrel, whereby to positively remove the crown therefrom and push it toward the chute 64.

The mandrel 6 is usually of a diameter sufficiently large to receive pineapple crowns of any size, and is mounted for vertical adjustment in order that it may be raised and lowered so that only the proper area of the crown to be treated is exposed below the funnel when the sections 22 and 23 are closed. To regulate the vertical position of the mandrel 6, a lever 73, fulcrumed in a bearing strap 74 carried by and extending below the shelf 3, is pivotally connected at 75, to the lower end of the vertically movable shaft 7 upon which the mandrel 6 is mounted. The upper end 76 of the lever extends toward the front of the machine and is adapted to rest in any one of a plurality of definitely spaced retaining sockets 77 formed in an angle bar 78 extending between the shelf 3 and one of the struts 4, this construction being best illustrated in Figs. 1 and 4.

In view of the foregoing explanations it is believed that no further detailed description of the specific operation of the machine is necessary. In actual practice two operators are necessary to service each machine, one operator feeding the crowns, slips or shoots to the mandrel through a funnel in the top of the table. The other operator of course actuates the treadle 14, and the lever 73.

The machine as herein described is capable of performing the work heretofore done by twelve to fifteen operators, removing the leaves by hand. The machine operation also offers less chance of injury to the seed nodules, since the stripping wires merely ride over the nodules, under the resiliency of the spring 50.

Obviously the machine may be actuated by a hand lever, or by a power motor operatively connected to a control adapted to depress the yokes A, B, C, D, and to govern the opening and closing of the section 23. I have herein disclosed one form of apparatus provided with means for accomplishing the desired results.

Figs. 11, 12 and 13 show views of a hand operated device. In this structure a bi-section funnel 80 is utilized, and it comprises two sections 81 and 82, pivoted at the top at 83. Surrounding the two sections 81 and 82, is a resilient band 84, preferably of elastic material such as rubber, but it may obviously be formed of a coiled spring. The band 84 is held in position by means of cleats 85 spaced around the periphery of the sections 81 and 82, and always tends to retain the lower end of the funnel 84 in closed position.

The funnel is mounted on a stand comprising a base 86, in which is mounted a staff 87, adjustable by means of a nut 88. The upper end of the staff 87 is shaped to the inclination of the funnel section 81, and is formed with an offset end portion 89, extending into bracket members 90 carried by said section 81, and may be secured in position by screws or thumb nut 91, if desired.

Directly below the lower end or mouth 92 of the funnel, a platform 93 is adjustably secured to the staff 87, the adjustment being effected by means of a screw-bolt 94, extending laterally from the rear edge of the platform, and projecting through a vertically elongated slot formed in the staff 87. A thumb nut 95 operatively engages said bolt 94, the structure operating in the well-known manner when it is desired to raise and lower the platform. A brace 96 is secured to the lower portion of the platform, the vertical side of said brace remaining in constant contact with the staff 87, and tending to prevent collapse of the platform under pressure applied thereto.

A handle member 97 is secured to the side of the funnel section 81, and two semi-circular cutter knives 99, 99 are fastened by bolts 99′, or otherwise to the lower portions of the sections 81 and 82 forming the lower mouth of the funnel 84, said sections 99, 99 projecting below the mouth 92 of the funnel. A distance piece 100, which may be in the form of a coiled spring, is secured above the top of the knives, for a purpose to be hereinafter explained.

In the operation of the device just described, the base 86 is placed upon the ground, and the operator holds the handle 97 with the left hand, while, with the right hand, he grasps and forcibly pushes a crown into and through the open top of the funnel 80. Under the downward movement of the crown, the outward pressure of the crown against the inside surfaces of the lower portion of the funnel members, causes the band 84 to flex and allow a separation of the mouth-forming lower ends of the said sections 81 and 82, and continued downward pressure will cause the crown to be seated on the platform 93. It is to be noted that, after the body of the crown passes the separated mouth-forming ends, the elasticity of the band 84 will restore said sections, and the knife sections 99, 99, to the position shown in Fig. 11, the lower leaves on the crown having been forced past the knives 99, 99, and having sprung outwardly to normal position as illustrated. In this position the right hand of the operator, which has never released its grasp on the top leaves of the crown, now imparts an upward pull and a simultaneous rotative twist upon the crown. Under such movement the lower leaves on the crown are cut, sheared or snapped off therefrom, by the cutters 99, 99, when the crown is forcibly pulled vertically past said cutters as will be understood. In the upward movement of the stripped crown past the cutters, the natural inward pull of the band cannot injure the exposed seed nodules of the crown, because of the counter pull of the distance piece 100.

Various modifications of this structure may be suggested to those skilled in the art, but my invention covers all embodiments falling fairly within the scope of the appended claims.

I claim:

1. Apparatus of the character described comprising a support for a pineapple crown, a hood adapted to cover the upper portion of said crown, a stripping device movable in a plane parallel to the plane of the surface of said hood and adapted for continued movement to contact and pass over the periphery of the crown below the hood, and means for moving said stripping device.

2. Apparatus of the character described comprising a support for a pineapple crown, a hood adapted to cover the upper portion of said crown, a stripping device movable in a plane parallel to the plane of the surface of said hood and adapted for continued movement to contact and pass over the periphery of the crown below the hood, means for moving said stripping device, and means operable to release the crown from said hood after said stripping device has passed over the periphery of said crown.

3. Apparatus of the character described comprising a support for a pineapple crown, a hood formed in a plurality of sections and adapted to cover the upper portion of said crown, a stripping device movable in contact with the surface of said hood and adapted for continued movement to pass over the periphery of the crown below the hood, means for moving said stripping device, and means operable to swing one section of said hood away from the crown to permit removal of the latter from said support.

4. Apparatus of the character described comprising a support for a pineapple crown, a hood formed in a plurality of sections and adapted to cover the upper portion of said crown, a stripping device movable in contact with the surface of said hood and adapted for continued movement to pass over the periphery of the crown below the hood, means for moving said stripping device, and means operable to swing one section of said hood away from the crown to permit removal of the latter from said support and to thereafter positively remove said crown from the support.

5. Apparatus of the character described comprising a support for a pineapple crown, a funnel having pivotally connected sections and adapted to surround the top of said crown, a stripping device movable longitudinally of and in contact with the outer surface of said funnel and adapted for continued movement to pass over the periphery of said crown below the funnel, means for moving said stripping device, and means operable to simultaneously rotate said support.

6. Apparatus of the character described comprising a support for a pineapple crown, a funnel having pivotally connected sections and adapted to surround the top of said crown, a stripping device movable longitudinally of and in contact with the outer surface of said funnel and adapted for continued movement to pass over the periphery of said crown below the funnel, means for moving said stripping device, and means operable to simultaneously rotate said support and to cause relative pivotal movement between said sections to release the crown from the funnel.

7. Apparatus of the class described comprising a support for a pineapple crown, a hood adapted to cover the upper portion of said crown, a pivotally mounted yoke carrying a stripping device at its forward end and movable towards and away from said hood, and means for moving said yoke towards said hood whereby to cause said stripping device to move in contact with the sides of said hood and to thereafter pass over the periphery of the crown below the hood substantially as described.

8. Apparatus of the character described comprising a support for a pineapple crown, a hood adapted to cover the upper portion of said crown, a plurality of yokes mounted adjacent said hood and each carrying a flexible stripping device, and means for moving the yokes into position such that each will straddle said hood and cause the stripping device carried by each yoke to move longitudinally of the hood and in contact with the outer surface thereof, said means being operable to cause a continuance of such movement until said stripping devices have passed beyond the end of the hood and over the periphery of the exposed portion of the crown, substantially as described.

9. Apparatus of the character described comprising a support for a pineapple crown, a hood adapted to cover the upper portion of said crown, a plurality of yokes mounted adjacent said hood and each carrying a flexible stripping device, means for moving the yokes into position such that each will straddle said hood and cause the stripping device carried by each yoke to move longitudinally of the hood and in contact with the outer surface thereof, said means being operable to cause a continuance of such movement until said stripping devices have passed beyond the end of the hood and over the periphery of the exposed portion of the crown, and means for restoring the yokes to normal position.

10. Apparatus of the character described comprising a support for a pineapple crown, a hood adapted to cover the upper portion of said crown a plurality of flexible stripping devices located adjacent said hood and adapted for movement in a plane such that the said devices have wiping contact longitudinally of the sides of said hood and over the exposed portion of said crown outside of the hood; and means for moving said devices and for restoring them to normal position.

11. Apparatus of the character described comprising a support for a pineapple crown, a hood enclosing the upper portion of said crown, a plurality of flexible stripping devices mounted adjacent said hood, and means for moving said devices into contact with the outer surface of said hood and to cause them to travel longitudinally of the latter and to finally pass over and in contact with the exposed portion of said crown in over-lapped relation, substantially as described.

12. Apparatus of the character described comprising a support for a pineapple crown, a hood enclosing the upper portion of said crown, a plurality of flexible stripping devices mounted adjacent said hood, means for moving said devices into contact with the outer surface of said hood and to cause them to travel longitudinally of the latter and to finally pass over and in contact with the exposed portion of said crown in over-lapped relation, and resilient means at all times tending to straighten said stripping devices.

13. Apparatus of the character described comprising a support for a pineapple crown, a hood enclosing the upper portion of said crown, a plurality of flexible stripping devices mounted adjacent said hood, means for moving said devices into contact with the outer surface of said hood and to cause them to travel longitudinally of the latter and to finally pass over and in contact with the exposed portion of said crown in over-lapped relation, and means operable to release said crown from said support.

14. Apparatus of the character described comprising a support for a pineapple crown, a hood enclosing the upper portion of said crown, a plurality of flexible stripping devices mounted adjacent said hood, means for moving said devices into contact with the outer surface of said hood and to cause them to travel longitudinally of the latter and to finally pass over and in contact with the exposed portion of said crown in over-lapped relation, and means for vertically adjusting the position of said support.

15. Apparatus of the character described comprising a support for a pineapple crown, a hood enclosing one end of said crown and leaving the other end thereof exposed, a plurality of flexible stripping devices normally located laterally of said hood, each stripping device being inclined at an angle to the horizontal axis of said hood, and means for moving said devices into contact with the sides of said hood and to cause them to travel longitudinally of the latter and to finally pass over the exposed portion of the crown, whereby to impose a shearing action upon the leaves carried by said crown, substantially as described.

16. Apparatus of the character described comprising a support for a pineapple crown, a hood enclosing one end of said crown and leaving the other end thereof exposed, a plurality of flexible stripping devices normally located laterally of said hood, each stripping device being inclined at an angle to the horizontal axis of said hood, means for moving said devices into contact with the sides of said hood and to cause them to travel longitudinally of the latter and to finally pass over the exposed portion of the crown, whereby to impose a shearing action upon the leaves carried by said crown, and means operable to simultaneously rotate said support.

17. Apparatus of the character described comprising a support for a pineapple crown, a hood enclosing one end of said crown and leaving the other end thereof exposed, a plurality of flexible stripping devices normally located laterally of said hood, each stripping device being inclined at an angle to the horizontal axis of said hood, means for moving said devices into contact with the sides of said hood and to cause them to travel longitudinally of the latter and to finally pass over the exposed portion of the crown, whereby to impose a shearing action upon the leaves carried by said crown, and means operable to release said crown from said hood and to positively move it from said support.

18. Apparatus of the character described comprising a support for a pineapple crown, a hood enclosing one end of said crown and leaving the other end thereof exposed, a plurality of flexible stripping devices normally located laterally of said hood, each stripping device being inclined at an angle to the horizontal axis of said hood, means for moving said devices into contact with the sides of said hood and to cause them to travel longitudinally of the latter and to finally pass over the exposed portion of the crown, whereby to impose a shearing action upon the leaves carried by said crown, means operable to release said crown from said hood and to positively move it from said support, and additional means for vertically adjusting the position of said support.

In testimony whereof I affix my signature.

CHARLES H. DOLAN, Jr.